US011300498B2

(12) United States Patent
Goodwin (10) Patent No.: US 11,300,498 B2
(45) Date of Patent: Apr. 12, 2022

(54) CORROSION SENSOR AND METHOD AND COMPUTERIZED SYSTEM FOR USING THE SAME

(71) Applicant: Micross Advanced Interconnect Technology LLC, Durham, NC (US)

(72) Inventor: Scott Goodwin, Chapel Hill, NC (US)

(73) Assignee: Micross Advanced Interconnect Technology LLC, Durham, NC (US)

( * ) Notice: Subject to any disclaimer, the term of this patent is extended or adjusted under 35 U.S.C. 154(b) by 170 days.

(21) Appl. No.: 16/453,117

(22) Filed: Jun. 26, 2019

(65) Prior Publication Data
US 2020/0408670 A1   Dec. 31, 2020

(51) Int. Cl.
*G01N 17/04* (2006.01)
*H01F 17/00* (2006.01)

(52) U.S. Cl.
CPC ......... *G01N 17/04* (2013.01); *H01F 17/0006* (2013.01)

(58) Field of Classification Search
CPC ...... G01N 17/00; G01N 17/02; G01N 17/006; G01N 17/04; H01F 17/0006
USPC .................................................. 324/240, 700
See application file for complete search history.

(56) References Cited

U.S. PATENT DOCUMENTS

| | | | | | |
|---|---|---|---|---|---|
| 5,286,357 A | * | 2/1994 | Smart | .................... | G01N 17/02 324/71.2 |
| 5,310,470 A | * | 5/1994 | Agarwala | .............. | G01N 17/02 324/700 |
| 5,338,432 A | * | 8/1994 | Agarwala | .............. | G01N 17/02 204/404 |
| 5,854,557 A | * | 12/1998 | Tiefnig | .................. | G01N 17/00 324/71.2 |
| 5,942,991 A | * | 8/1999 | Gaudreau | .......... | G06K 19/0717 340/505 |

(Continued)

FOREIGN PATENT DOCUMENTS

BR   102015002329 A2 * 12/2015   ............... B64D 1/00
CN   103499022 A   1/2014

(Continued)

OTHER PUBLICATIONS

Derouin et al. 2013. "Development and Application of the Single-Spiral Inductive-Capacitive Resonant Circuit Sensor for Wireless, Real-Time Characterization of Moisture in Sand." Retrieved Apr. 2019.

*Primary Examiner* — Patrick Assouad
*Assistant Examiner* — Sean Curtis
(74) *Attorney, Agent, or Firm* — Olive Law Group, PLLC (57) ABSTRACT

A sensor, method, and system for sensing corrosion. The sensor may be used to monitor the integrity of structural elements. The sensor, method, and system utilizing an inductive element formed on the substrate and having a first inductive loop and a second inductive loop. The sensor also includes a sensing element electrically connecting one end of the first inductive loop to an opposing end of the second inductive loop. Prior to dissolution of the sensing element, an inductance of the inductive element comprises a first inductance set by the first predetermined number of turns of the inductor coil having a first resonant frequency. After dissolution of the sensing element, the inductance of the inductive element comprises a second inductance reduced from the first inductance.

20 Claims, 10 Drawing Sheets

(56) References Cited

U.S. PATENT DOCUMENTS

| | | | | |
|---|---|---|---|---|
| 5,977,782 | A * | 11/1999 | Kordecki | G01N 33/2888 324/700 |
| 6,490,927 | B2 * | 12/2002 | Braunling | G01N 17/04 73/597 |
| 6,919,729 | B2 * | 7/2005 | Tiefnig | G01N 17/00 324/700 |
| 7,086,593 | B2 * | 8/2006 | Woodard | H01Q 1/2208 235/449 |
| 7,129,471 | B2 * | 10/2006 | Frot | G01N 21/431 385/12 |
| 7,313,947 | B2 * | 1/2008 | Harris | G01N 17/006 324/71.2 |
| 7,714,593 | B2 * | 5/2010 | Varpula | G08C 17/04 436/121 |
| 7,950,289 | B2 * | 5/2011 | Foote | G01M 11/083 73/786 |
| 8,054,092 | B2 * | 11/2011 | Fay | G01N 27/24 324/700 |
| 8,085,165 | B2 * | 12/2011 | Wavering | H04Q 9/00 340/870.02 |
| 8,149,004 | B2 * | 4/2012 | Raju | G01N 17/02 324/700 |
| 9,097,745 | B2 * | 8/2015 | Steinwandel | G01R 27/02 |
| 9,176,058 | B2 * | 11/2015 | Ban | G01D 5/35367 |
| 9,395,290 | B2 * | 7/2016 | Bridges | G01N 17/04 |
| 9,470,630 | B2 * | 10/2016 | Ban | G01M 11/085 |
| 9,677,992 | B2 * | 6/2017 | Kuriki | C23F 11/18 |
| 9,927,381 | B2 * | 3/2018 | Schindelholz | G01N 27/026 |
| 10,209,175 | B2 * | 2/2019 | Goodwin | G01N 17/04 |
| 10,330,586 | B2 * | 6/2019 | Ulmer | G01N 17/04 |
| 10,768,092 | B2 * | 9/2020 | Friedersdorf | G01N 27/023 |
| 10,768,093 | B2 * | 9/2020 | Friedersdorf | G01N 33/0031 |
| 2006/0125493 | A1 * | 6/2006 | Subramanian | G01N 17/04 324/700 |
| 2007/0159187 | A1 | 7/2007 | Chen et al. | |
| 2007/0176773 | A1 * | 8/2007 | Smolander | G01N 33/12 340/572.1 |
| 2007/0186677 | A1 | 8/2007 | Zunino et al. | |
| 2007/0241762 | A1 * | 10/2007 | Varpula | G08C 17/06 324/655 |
| 2008/0174323 | A1 * | 7/2008 | Raju | G01N 17/02 324/700 |
| 2008/0204275 | A1 * | 8/2008 | Wavering | G01N 17/04 340/870.16 |
| 2013/0106447 | A1 * | 5/2013 | Bridges | G01N 17/04 324/700 |
| 2014/0092389 | A1 * | 4/2014 | Ban | G01M 11/083 356/445 |
| 2014/0326340 | A1 * | 11/2014 | Kuriki | F24D 19/0092 137/565.11 |
| 2016/0011107 | A1 * | 1/2016 | Ban | G01M 11/083 356/445 |
| 2018/0003615 | A1 | 1/2018 | Kessler et al. | |
| 2019/0178784 | A1 * | 6/2019 | Goodwin | G01N 17/04 |
| 2019/0293547 | A1 * | 9/2019 | Daneshmand | G01N 22/02 |
| 2020/0408670 | A1 * | 12/2020 | Goodwin | H01F 17/0006 |

FOREIGN PATENT DOCUMENTS

| | | | | |
|---|---|---|---|---|
| CN | 107766906 | A | 3/2018 | |
| EP | 1695312 | B1 * | 4/2008 | ......... G06K 19/0717 |
| EP | 2124034 | A1 * | 11/2009 | ............ G01N 17/04 |
| FR | 3111426 | A1 * | 12/2021 | |
| KR | 101293077 | B1 | 8/2013 | |
| WO | WO-2005059859 | A1 * | 6/2005 | ......... G06K 19/0717 |
| WO | WO-2005060653 | A2 * | 7/2005 | ........... G01N 27/221 |
| WO | 2007051216 | A3 | 6/2007 | |
| WO | 2009103302 | A1 | 8/2009 | |

* cited by examiner

CORROSION SENSOR AND METHOD AND COMPUTERIZED SYSTEM FOR USING THE SAME

BACKGROUND OF THE INVENTION

Field of Invention

The invention relates to a corrosion sensor and a method for detecting and monitoring corrosion.

Discussion of the Background

The need to monitor the integrity of structural elements arises in many different applications. For example, as described in U.S. Pat. No. 8,054,092 (the entire contents of which are incorporated herein by reference), it is necessary to monitor the structures of aircraft. The aircraft stay in service for many years and may experience environments that may exceed design limits resulting in different types of failures, e.g., fatigue, fracture, corrosion. Therefore, it is necessary to regularly check the structural integrity of the vehicle as part of any prudent maintenance program. Similarly, other types of structures may also require regular monitoring. Highway structures such as overpasses and bridges must be regularly checked. Some building structures may also require regular testing. Conventional testing techniques such as visual inspection, x-ray, dye penetrant, and electrical field techniques (e.g. eddy current testing, etc.) for testing structural elements have many drawbacks.

Of these techniques, non-destructive eddy current testing is often used, but time consuming and difficult to read reliably. As described in the '092 patent, in typical eddy current testing for example, a circular coil carrying an AC current is placed in close proximity to an electrically conductive specimen to be tested. The alternating current in the coil yields a changing magnetic field, which interacts with the test object and induces eddy currents in it. Variations in the phase and magnitude of these eddy currents can be monitored using a second coil, or by measuring changes to the current flowing in the primary coil. The presence of any flaws or variations in the electrical conductivity or magnetic permeability of the test object, will cause a change in eddy current flow and a corresponding change in the phase and amplitude of the measured current. The technique is generally limited to detecting surface breaks or near surface cracking and variations in material composition.

Specifically designed corrosion sensors have been developed.

U.S. Pat. No. 9,097,745 (the entire contents of which are incorporated herein by reference) describes a corrosion detection apparatus for permanently and integrally monitoring a state of corrosion of a component is provided. The corrosion detection apparatus in the '745 patent uses a change in electrical conductivity to detect corrosion of a component to be monitored. In the '745 patent, a corrosion-sensitive bridging element formed an electrical connection between a first electrical line section and a second electrical line section of a sensor circuit. On account of the corrosion-sensitive property of the bridging element, changes in its electrical conductivity when corrosion starts is detected by a change in the overall reactance of the first electrical line section and the second electrical line section Other corrosion sensors have based on remote RF sensing of Inductor-Capacitor (L-C) circuits. Those circuits often consisted of a pancake metal coil fabricated on a glass substrate with a thin dielectric layer over the coil. The inductance and fringing capacitance of these types of coil results in the coil having resonant frequency. The resonant properties of the coil can be measured, such as the resonant frequency, the Q of the coil, and the insertion loss. When these corrosion sensors are placed in a coating, the fringing capacitance between the turns of the coils reaches out into the coating that is above the fabricated thin dielectric layer over the coil. As a result, the capacitance of the coil is then influenced by the dielectric properties of the coating. If the real portion of the dielectric constant of the coating increases, the capacitance increases, and the resonant frequency of the coil decreases. If the imaginary portion of the dielectric constant increases, the loss increases, and the Q decreases. In this manner the sensors can detect changes in the coating.

A variety of wireless devices powered externally are described in the literature. A number of these methods require that the sensor be interrogated to determine the resonant frequency or Q factor using an external device reader. These methods involve sensing elements within the circuit that, when altered by a physical affect, cause the resonant frequency of the circuit to change.

The wireless device of Varpula US 2007/0241762 (the entire contents of which are incorporated herein by reference) describes monitoring environmental conditions using an inductive element that is not electrically (galvanically) connected to the resonant circuit. This method requires determination of the resonant frequency or quality (Q) factor in order to detect environmental contaminants.

Woodard U.S. Pat. No. 7,086,593 (the entire contents of which are incorporated herein by reference) describes a resonant electrical circuit that senses physical changes in the environment by changes in the capacitive element of the electrical circuit. Changes in the capacitive element of the circuit alter the resonant frequency of the circuit. The sensing element is formed from metal conductors that have parallel plates or interdigitated printed pattern geometries. The capacitance change is dependent on environmental interaction with the dielectric medium between the two capacitor electrodes.

Another device by Subramanian US 2006/0125493 (the entire contents of which are incorporated herein by reference) describes the use of a coil wirelessly coupled to an antenna that can be used to power a corrosion sensor. The resistance of the sensing element is a function of the corrosion damage and this property change is used to measure corrosion damage. The measurement range and sensitivity is dependent on the length and cross sectional area of the sensing element. In general, long thin patterns of metallic conductors are used to achieve the desired service life and desired damage sensitivity.

U.S. Pat. No. 8,085,165 (the entire contents of which are incorporated herein by reference) describes a sensor which included a parasitic element that interacts with the environment and influences the intensity of the electromagnetic response between an inductive element of the sensor and an antenna of the interrogation reader device. The condition of the parasitic element is determined by the radio frequency interaction of the reader antenna and the inductive element of the sensor.

SUMMARY OF THE INVENTION

In one embodiment, there is provided a sensor for sensing corrosion. The sensor utilizes a substrate; an inductive element formed on the substrate and having a first inductive loop and a second inductive loop; a sensing element electrically connecting one end of the first inductive loop to an opposing end of the second inductive loop; wherein prior to dissolution of the sensing element, an inductance of the inductive element comprises a first inductance set by a total inductance of the first inductive loop and the second inductive loop having a first resonant frequency, and after dissolution of the sensing element, the inductance of the inductive element comprises a second inductance reduced from the first inductance by disconnection of the first inductive loop from the second inductive loop such that a resonance of the inductive element is changed from the first resonant frequency to a second resonant frequency.

In one embodiment, there is provided a method for sensing corrosion utilizing the sensor above. The method acquires at least one of a resonant frequency and a Q of a sensor including a loop with an integrated corroding link, exposes the link of the sensor to an ambient in which the corroding link deteriorate, records changes over time of at least one of the resonant frequency and the Q of the loop; and determines that corrosion is present based on at least one of a reduced Q and a discrete change in resonance frequency.

It is to be understood that both the foregoing general description of the invention and the following detailed description are exemplary, but are not restrictive of the invention.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
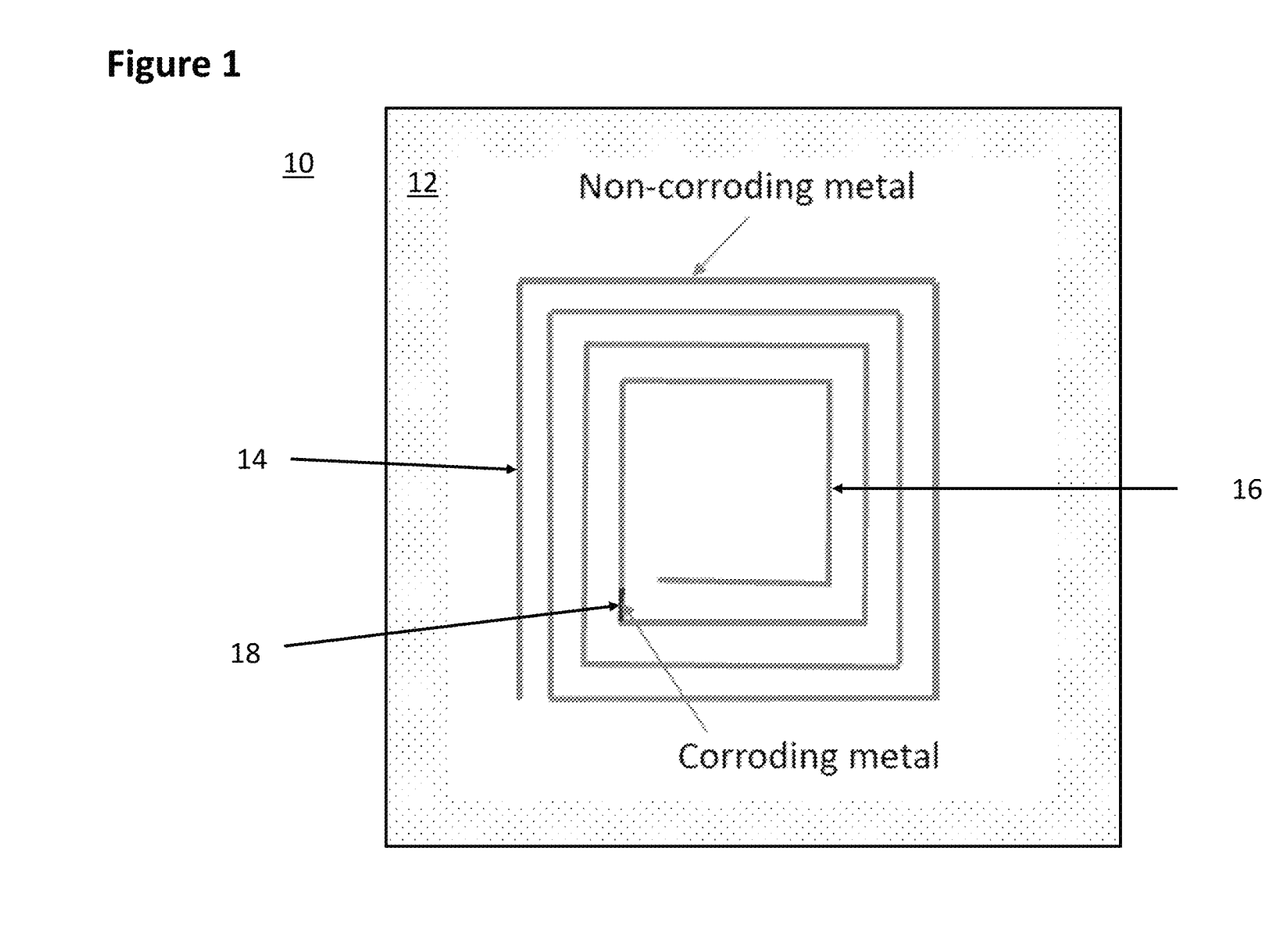
FIG. 1 is a schematic of a sensor according to one embodiment of the invention having an integrated corroding link on an inductive element.

FIG. 1 is a schematic showing one embodiment of the invention where corrosion sensor 10 is composed of a substrate has an inductive element formed thereon composed of a first inductive loop 14 and a second inductive loop 16. A link 18 of sacrificial material that can corrode away connects the first inductive loop 14 and the second inductive loop 16. When link 18 corrodes away, the resonant frequency of the sensor 10 changes due to the loss of inductor turn(s), that is the loss of second inductive loop 16.

This design results in a change in the metal structure of the coil as opposed to only sensing changes in a fringing capacitance of the coil, as in prior art devices. By including a region in the coil that is designed to corrode directly, that is link 18, the metal structure of the first inductive loop 14 and the second inductive loop 16 changed as a function of corrosion. With the use of different metals for the loops 14, 16 and the link 18, the location of the corrosion can be localized on the coil. For example, the majority of the coil (loops 14, 16) can be fabricated with a non-corroding metal such as gold, and a link 18 (shown in FIG. 1 as relatively small link) can be fabricated with a corroding metal such as iron, copper, or silver. In a preferred embodiment, the corroding section of the coil (link 18) would be placed near the end of the coil (loops 14, 16), for example approximately one turn from the end. As illustrated in FIG. 1, before corrosion the coil (loops 14, 16) has four turns. After corrosion opens up link 18, the coil has three turns, resulting in a upward shift in the resonant frequency of the coil.

Prior to the exposure of the coil to a corroding environment, the L-C circuit behavior would have a resonant frequency that is determined by the inductance and capacitance of the coil. As the sensor coil is exposed to the corroding environment, the corrodible material (link 18) will begin to be converted for example into a more resistive oxide, and the cross-sectional area of the conducting metal of link 18 will be reduced, increasing the resistance of the coil. This will result in a reduction in the Q of the resonant behavior. As the corrosion continues, at some point the electrical conduction in the corrodible segment will stop as it is fully corroded. At that point, the coil is now in two pieces, loop 14 and loop 16. In FIG. 1, the larger portion of the coil (loop 14) has approximately one less turn because of the disconnection to the smaller single turn section (loop 16). The resonant frequency of the larger section will increase due to the reduction in the inductance.

Measurements of a 2.5 mm coil with 7 turns show a resonant frequency of 1344 MHz and after using a laser to make a cut one turn from the end (now a coil with 6 turns) show a resonant frequency of 1425 MHz. A shift of 6% in resonant frequency was observed. This shift is discrete in nature as the coil changes the number of turns, resulting in a simpler measurement of corrosion. Shifts in resonant frequency are relatively easy to detect.

In one embodiment, there are no capacitive elements connected to the first inductive loop 14 and the second inductive loop 16, which would change the resonance of sensor 10 having the inductive element formed thereon. In one embodiment, there are no resistive, elements connected to the first inductive loop 14 and the second inductive loop 16, which would change the Q of sensor 10 having the inductive element formed thereon. In one embodiment, there are no other inductive elements connected to the first inductive loop 14 and the second inductive loop 16, which would change the resonance of the sensor 10 having the inductive element formed thereon.

In one embodiment of the invention, changes in the placement of the corroding segment will change the shift in the resonant frequency after corrosion by altering the dimensions of the final, corroded coil. The smaller coil (loop 16) on the other side of the corroded segment can also resonate at its characteristic frequency, so it is possible in one embodiment of the invention to measure two separate resonant frequencies after corrosion.

Figure 2:
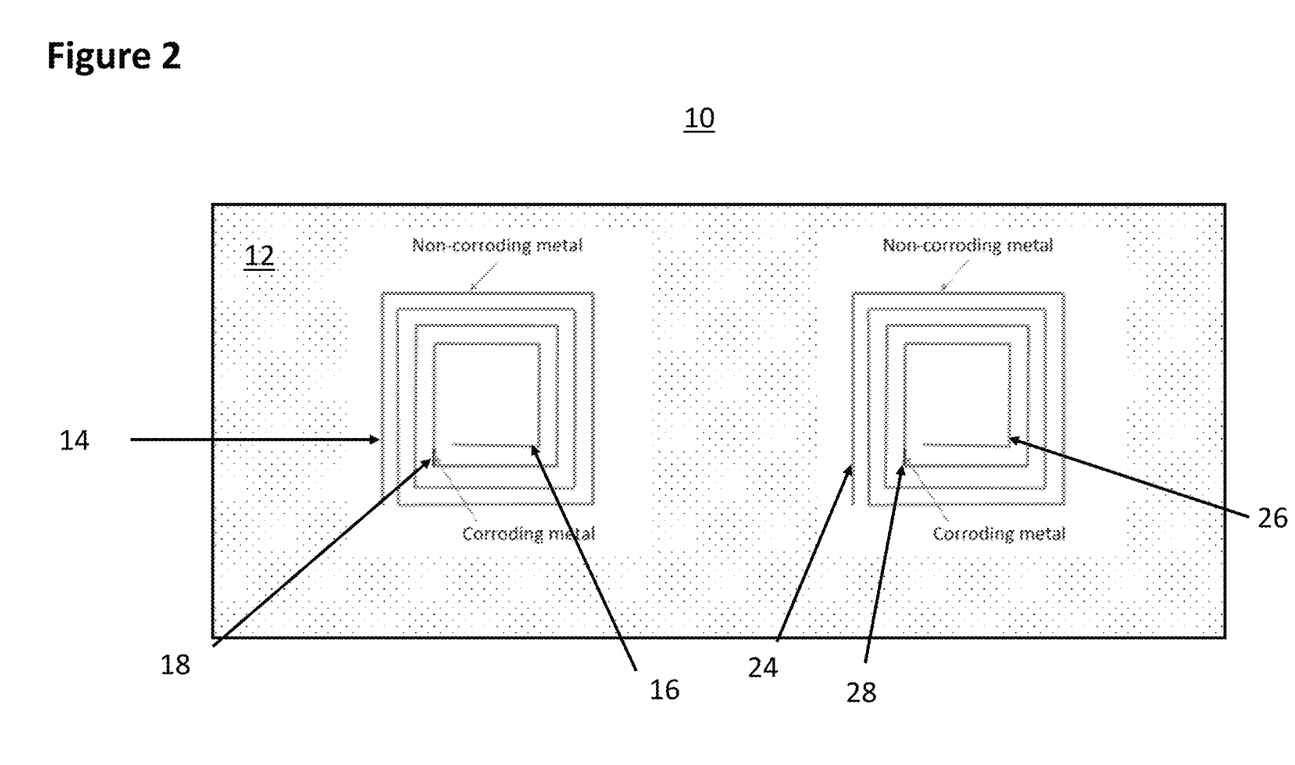
FIG. 2 is a schematic of another sensor of the invention having multiple corroding links on multiple inductive elements.

Different metals and thicknesses for the corroding segment can be chosen to adjust the sensitivity of the corrosion sensors. Thinner films and/or metals that corrode quickly will result in sensors that will change its resonant frequency more quickly when exposed to a corrosive environment. Thicker films and/or metals that corrode slowly will result in sensors that take longer to change its resonant frequency when exposed to a corrosive environment. FIG. 2 is a schematic showing a sensor formed of two separate loops (14,16 and 24, 26) each having their own respective corroding links 18 and 28, where the corroding link in one coil is thicker or thinner or of a material having a different corrosion rate than the corroding link in the other coil.

Figure 3:
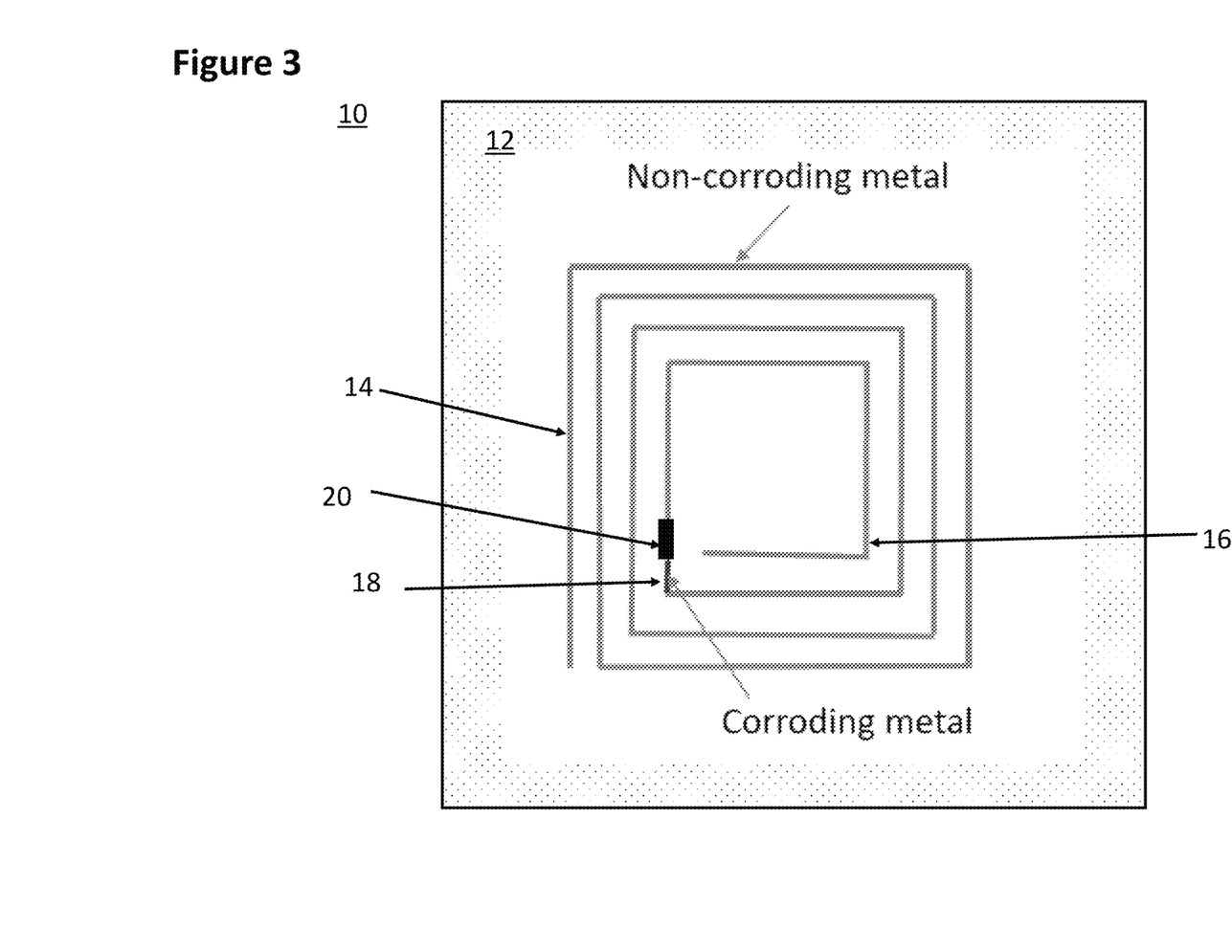
FIG. 3 is a schematic of another sensor of the invention having a galvanic material disposed with the corroding link.

Galvanic corrosion can also be used to adjust the rate of the corrosion of the corroding segment. The combination of the non-corroding section of the coil and the corroding segment in the presence of an electrolyte can increase or decrease the rate of the corrosion. A third metal can also be added for a more independent control of the galvanic corrosion either at the ends of the corroding section, or in a bilayer of metals in the part or all of the corroding section. FIG. 3 is a schematic showing a sensor formed of loops 14,16, a corroding link 18 therebetween, and a third metal section 20 at one end of the corroding link for affecting galvanic corrosion. It is well know that various metals can be arranged in a galvanic series for different electrolytes, with the metals ranked from most cathodic or noble, to most anodic. By making the corroding section more anodic compared to the third section, corrosion will be enhanced in the corroding section. One possible combination would be to have the corroding section constructed with an iron layer, the coil constructed with a copper layer, and the third section constructed with a gold layer. Gold is considerably more cathodic compared to iron so the corrosion of the iron would be enhanced, while gold is only slightly more cathodic than copper so there will be little enhanced corrosion of the copper. Since most of the metal in the sensor is copper with just a small section of gold, the cost of the sensor is minimized.

Figure 4:
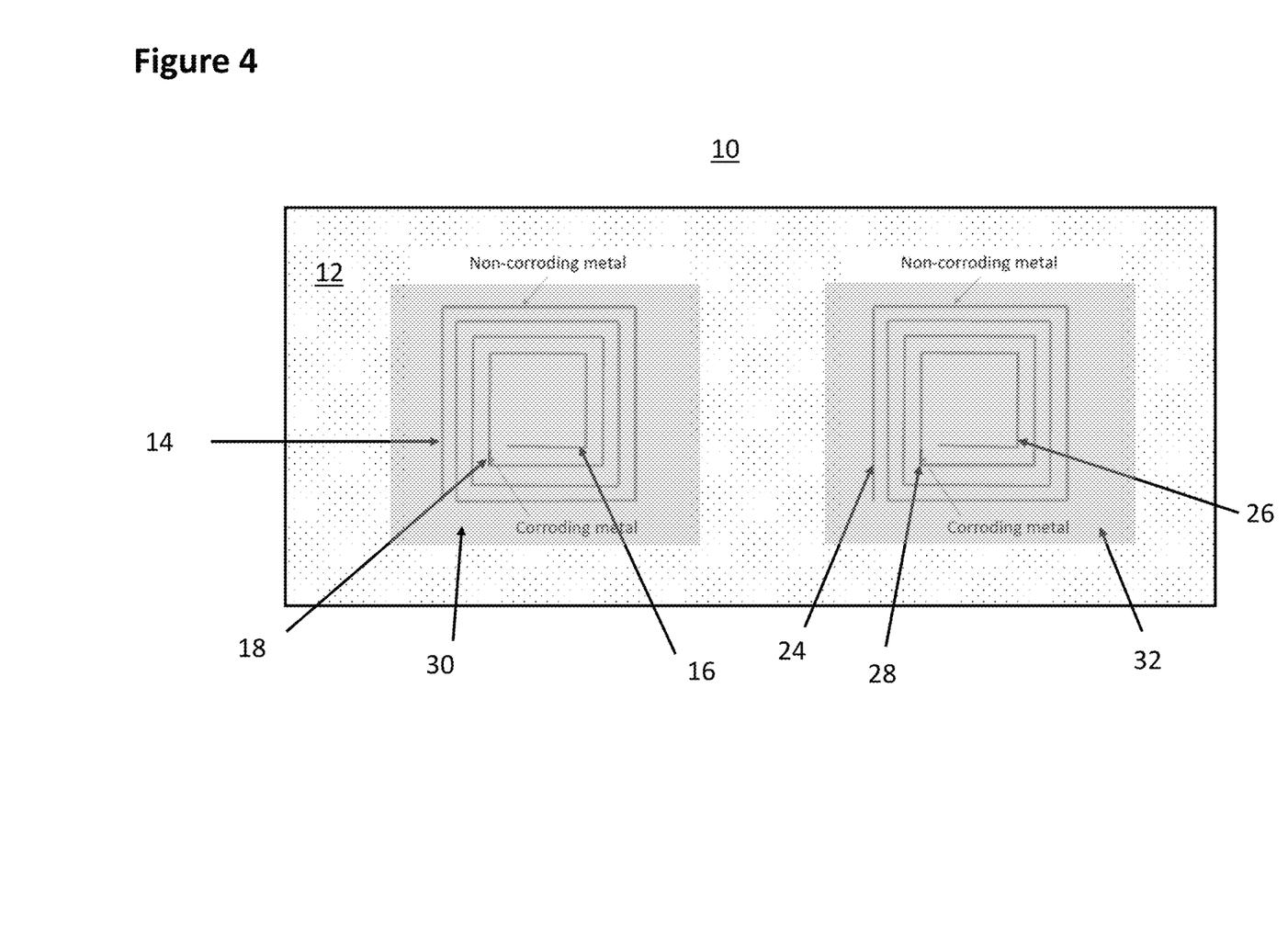
FIG. 4 is a schematic of another sensor of the invention having a dielectric disposed in a vicinity of the corroding link.

In one embodiment of the invention, the presence of a dielectric film over the coil can also be used to control the rate of corrosion in the corroding segment. Control of the porosity of the dielectric film to the corroding liquids will affect the corrosion rate. A higher level of porosity would result in a faster rate of corrosion. FIG. 4 is a schematic showing a sensor formed of two separate loops (14,16 and 24, 26) each having their own respective corroding links 18 and 28. Loops 14, 16 and corroding link 18 have a dielectric film 30 disposed thereon. A variety of materials have been developed for semiconductors with varying levels of porosity. Porous silicon dioxide films are possible through control of the deposition or growth process. Porous organosilicate glasses have been created with co-deposition of an organic phase with a organosilicate phase followed by an curing/anneal step which decomposes the organic phase leaving pores in the film. Different polymer films have different levels of porosity for example polyimide is well known to absorb moisture while parylene is well known as having a very low water vapor transmission rate.

In one embodiment of the invention, the dielectric film is patterned so that there is no dielectric film over the corroding segment, and an impervious film is deposited over the rest of the sensor. In FIG. 4, loops 26, 26 have impervious dielectric film 32 formed over them with the link 28 not covered. In one embodiment of the invention, the dielectric film could be patterned and made from different materials to have different porosities over the corroding segment and the remainder of the coil.

Figure 5:
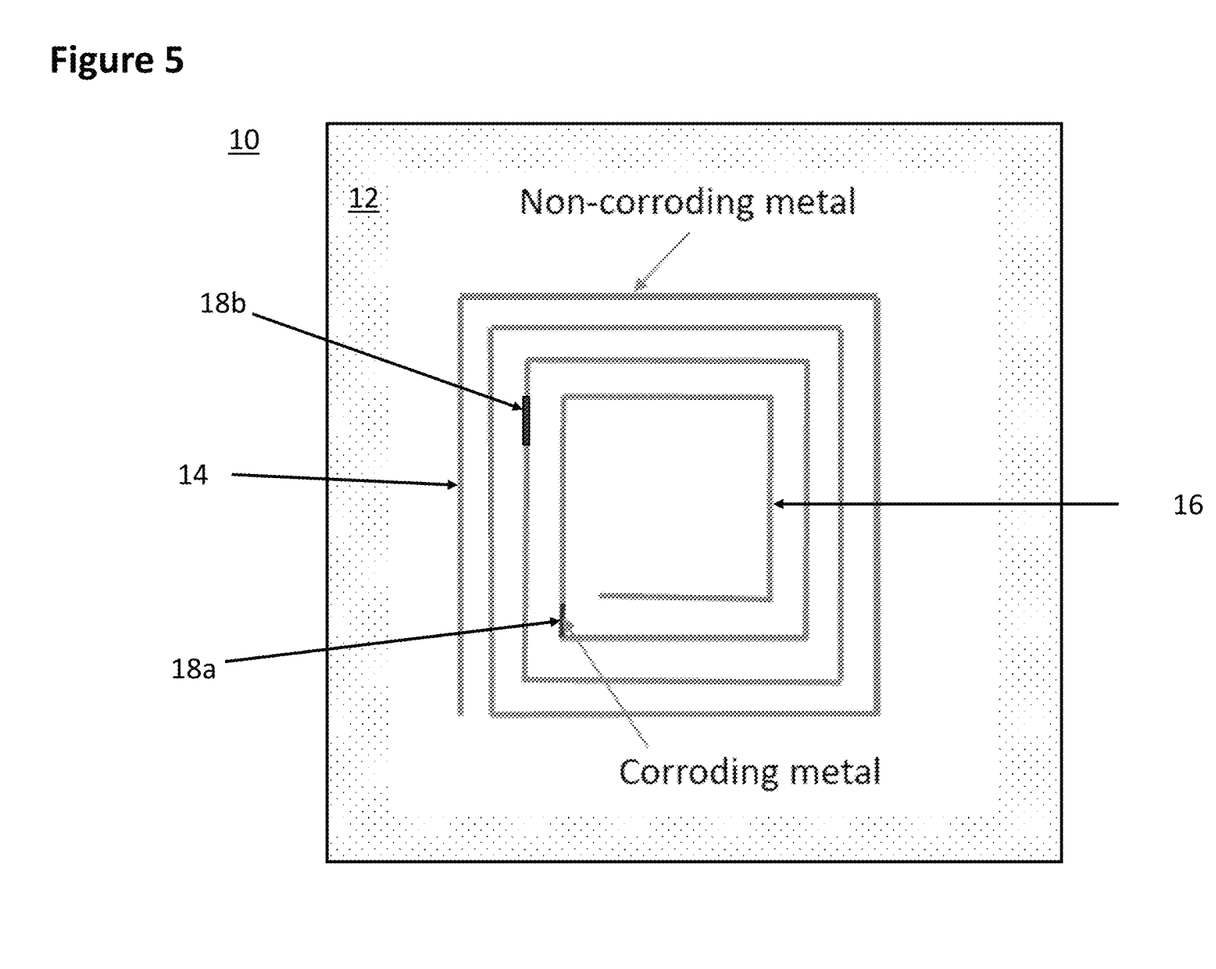
FIG. 5 is a schematic of another sensor of the invention having multiple corroding links on a single inductive element.

In one embodiment of the invention, the sensor coil could have more than one corroding segment in the length of the coil. FIG. 5 is a schematic showing a sensor formed with loops (14,16) and two corroding links 18a and 18b. By controlling the corrosion rates or time to completely corrode the different segments 18a and 18b, the resonant frequency of a sensor could shift more than one time as the different segments 18a and 18b corrode completely. Thus. the sensor would be capable of detecting different amounts of corrosion. As the first segment 18a corrodes closest to the end of the coil, there would be a first upward shift in the resonant frequency. After additional corrosion, the second segment 18b (in this example the next closest to the end of the coil) would corrode, and there would be a second upward shift in the resonant frequency. The corrosion rates/time to corrode of the segments could be controlled by the dimensions or composition of the corroding material, or by the porosity of the dielectric layer over the segments.

In one embodiment of the invention, the corroding segments 18a and 18b can be place either near the outer end or the inner end of the coil. Placement near the inner end would maintain the larger outer end dimensions of the coil that will maintain the detectable signal strength of the coil, which is preferred but not necessary.

Figure 6:
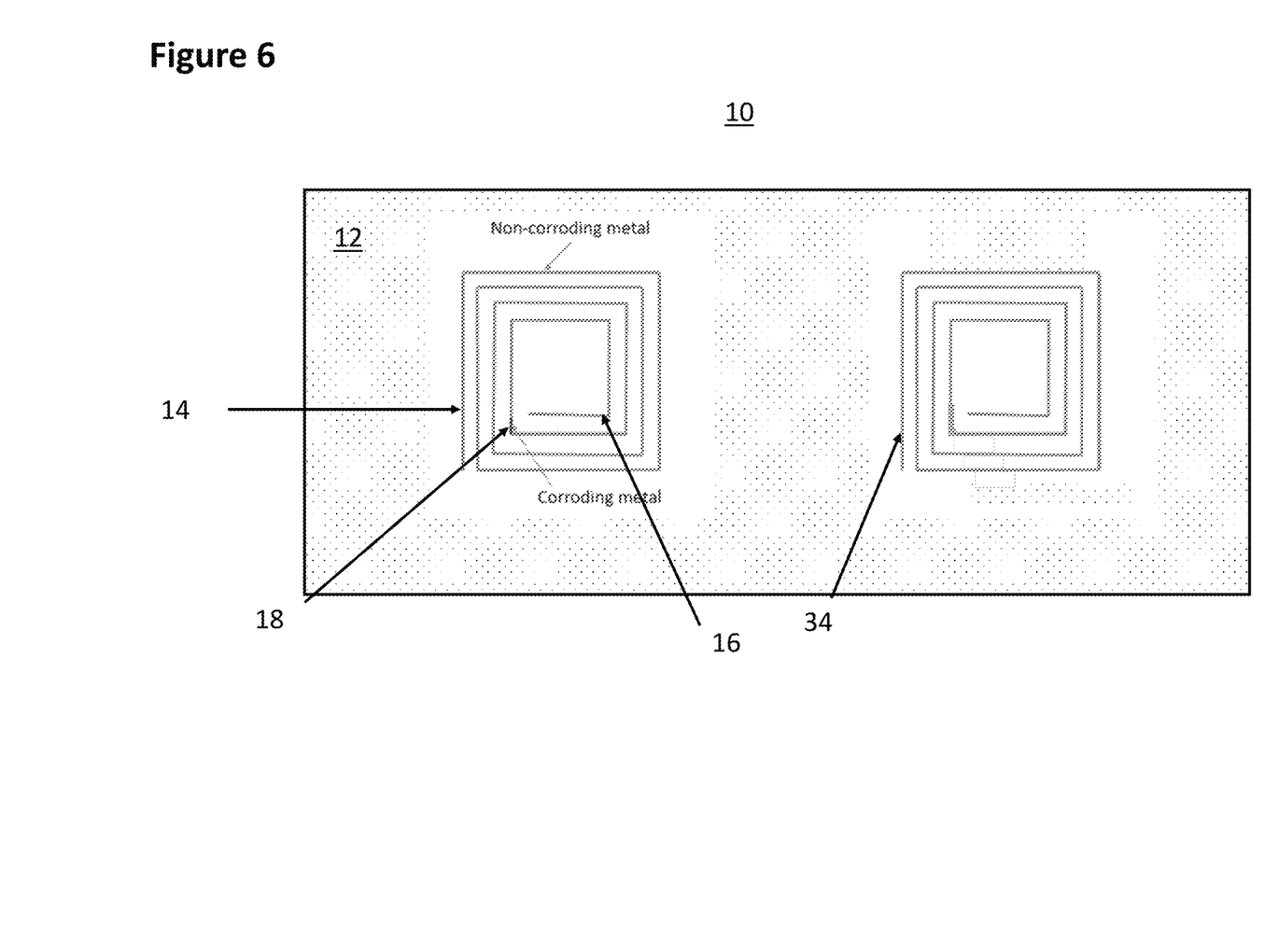
FIG. 6 is a schematic of another sensor of the invention having a temperature sensitive section.

In one embodiment of the invention, an additional aid to the detection of corrosion is obtained through knowledge of the temperature of the sensor. FIG. 6 is a schematic showing a sensor formed with two loops (14,16) with a corroding link 18, and a loop 34 with no corroding link. A sensor coil can be designed to maximize its sensitivity to temperature by using a metal for loop 34 with a large temperature coefficient of resistance. Cu and Au have smaller coefficients of 0.004 $K^{-1}$, while Ni has a higher value 0.0068 $K^{-1}$. Minimizing the spacing between the coils in loop 34 will limit the extent of the fringing capacitive fields above the coil of loop 34 and using a thick dielectric layer (e.g., greater than 10 microns) can limit the interactions with the coatings. Also, use of an impervious dielectric layer (as discussed above) would limit any moisture uptake for loop 34. These design choices will limit the sensitivity of loop 34 to the environment other than temperature. As the temperature changes, the resistance of the loop 34 will change because of the large temperature coefficient of resistance resulting in a change in Q. By designing loop 34 to resonate at a frequency that is different from the corroding loop 14, 16, the RF measurements can distinguish between the loop of the sensor 10 that is tracking temperature from loop of sensor 10 that is directly detecting corrosion.

Figure 7:
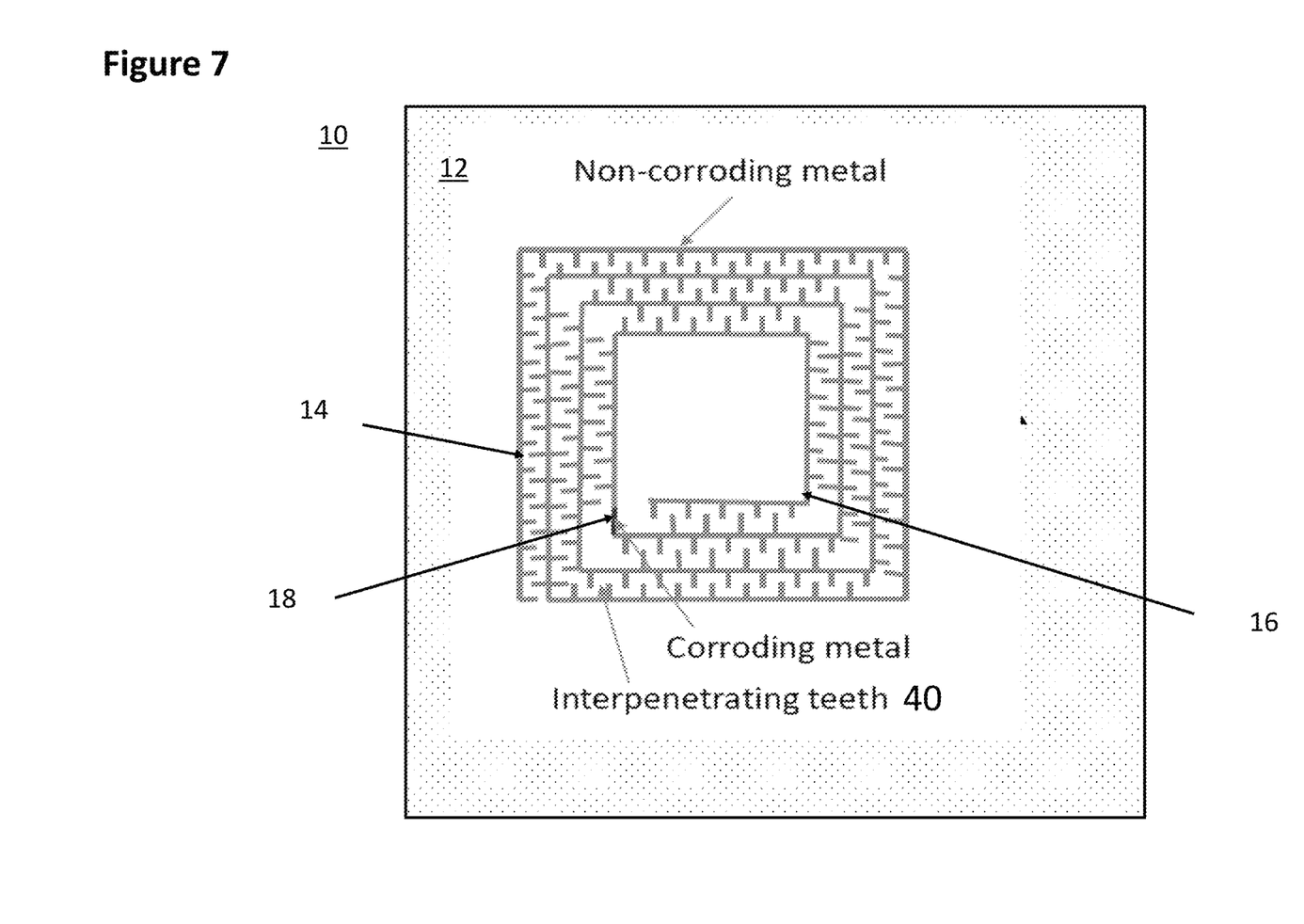
FIG. 7 is a schematic of another sensor of the invention having interpenetrating teeth on the inductive element.

Improved control of the resonant frequency of the sensors can be achieved by adding interpenetrating metal teeth between the turns of the coils. FIG. 7 is a schematic showing a sensor formed with two loops (14,16) with a corroding link 18, and the loops (14, 16) having interpenetrating metal teeth 40. Adding the teeth will increase the capacitance between the turns of the coil. The increased capacitance will reduce the resonant frequency of the coil and permit the sensor to be designed with an additional variable for setting the resonant frequency.

Figure 8:
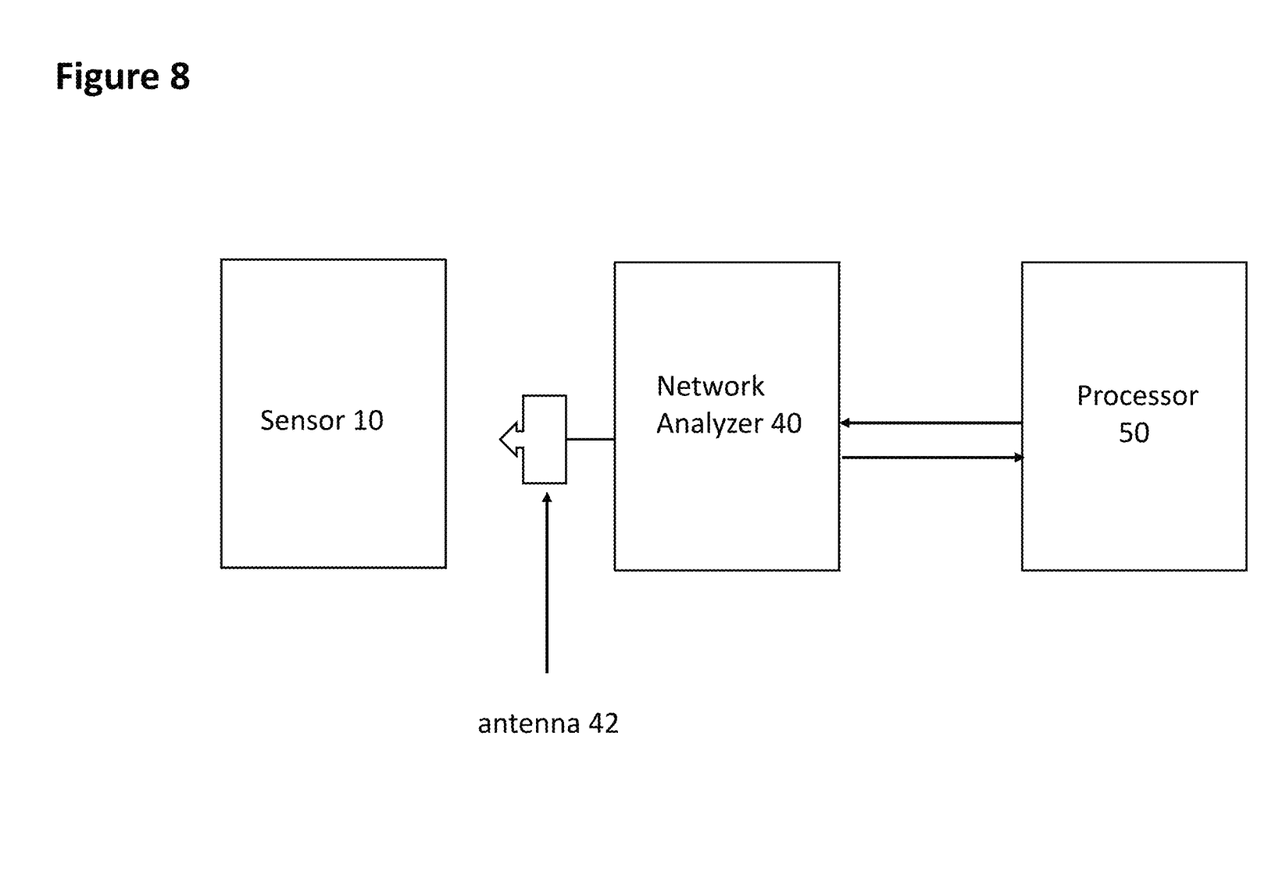
FIG. 8 is a schematic of a corrosion detection system of the invention.

FIG. 8 is schematic showing a sensor 10 of the invention (e.g., any of the sensors in FIGS. 1-7) coupled to a network analyzer 40 in communication with a processor 50. The network analyzer 40 is disposed in proximity to and is coupled to the loops of sensor 10 through an RF antenna that is connected to the network analyzer 40. The network analyzer 40 measures the resonant frequency or resonant frequencies. From the width of the resonances, the Q of the loops can be determined. As shown in FIG. 8, the network analyzer 40 can be in two-way communication with a processor 50 directing the activities of the network analyzer and recording data over time acquired by spectrum analyzer.

The network analyzer 40 can be vector network analyzer such as described in U.S. Pat. Appl. Publ. No. 2015/0212129 (the entire contents of which are incorporated herein by reference). The '129 publication describes vector network analyzer (VNA) for analyzing the response of a device under test (DUT), the VNA comprising a plurality of VNA ports configured to be connected to the DUT; a plurality of source ports configured to be connected to the VNA ports; a plurality of couplers for coupling a plurality of coupled signals, wherein said plurality of coupled signals are combined to provide a sum signal; and a receiver configured to receive the forward sum signal. Here, in this invention, the device under test would be an RF antenna coupled to the loops of the sensors. Since the loops have known resonances when connected and disconnected, the vector network analyzer can be configured to have the source ports generate high frequency signals at those resonant frequency values and evaluate the response at the receiver for each of those frequencies. Typically, the vector network analyzer would sweep through a range of high frequency signals that include the different resonant frequencies of the sensors.

Other types of network analyzers can be used such as scalar network analyzers commercially available from Signal Hound, Battle Ground, Wash. 98604 USA and vector network analyzers from Pico Technology, Tyler, Tex. 75702 USA.

Figure 9:
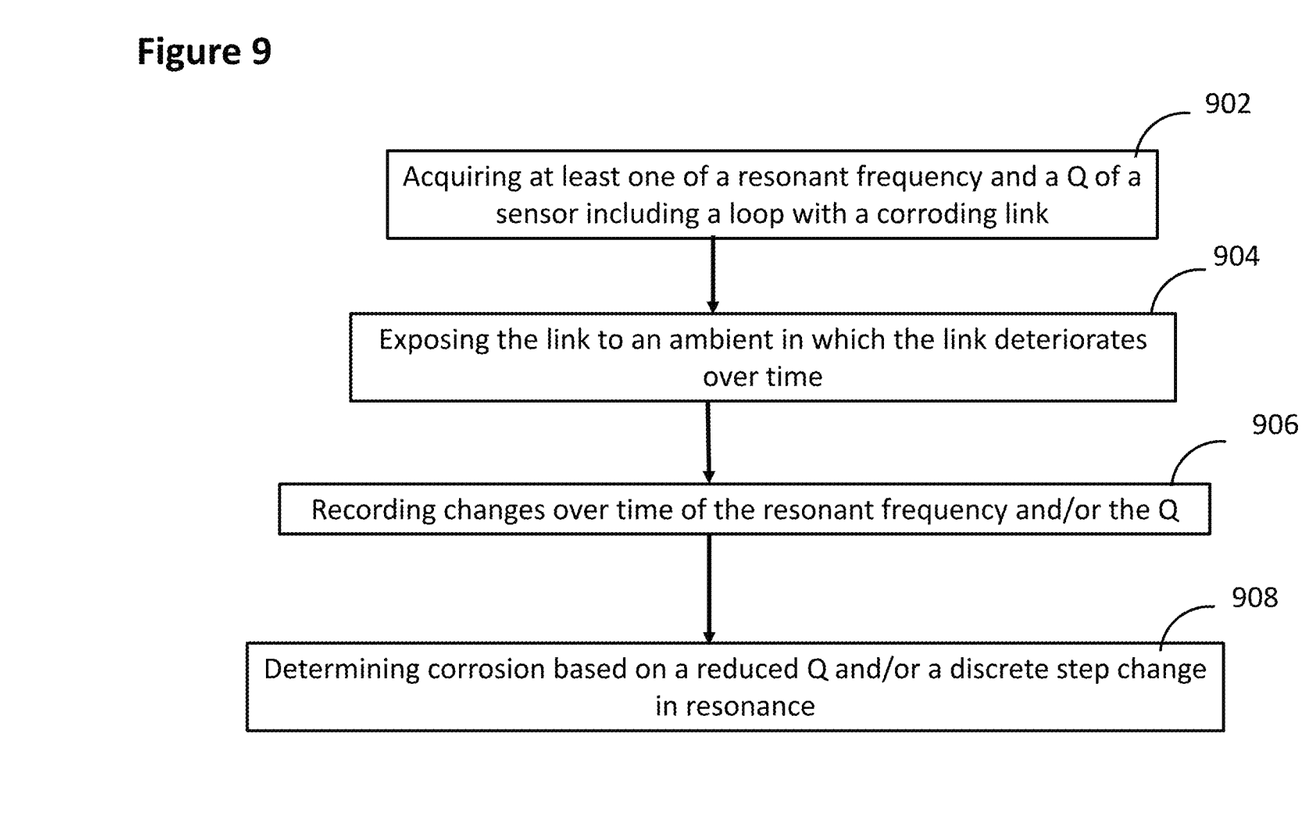
FIG. 9 is a schematic of a flow chart of the invention detailing a method for sensing corrosion.

FIG. 9 is a flow chart illustrating a method of the invention. At step 902, at least one of a resonant frequency and a Q of a sensor including a loop with an integrated corroding link is acquired. At 904, the link of the sensor is exposed over time to an ambient in which the corroding link deteriorates (changes it resistance and eventually opens providing no electrical connection therethrough). At 906, changes over time of the resonant frequency and/or the Q of the loop are recorded. At 908, a determination of corrosion is made based on a reduced Q and/or a discrete step change in resonance.

Computer-Assisted Control

Figure 10:
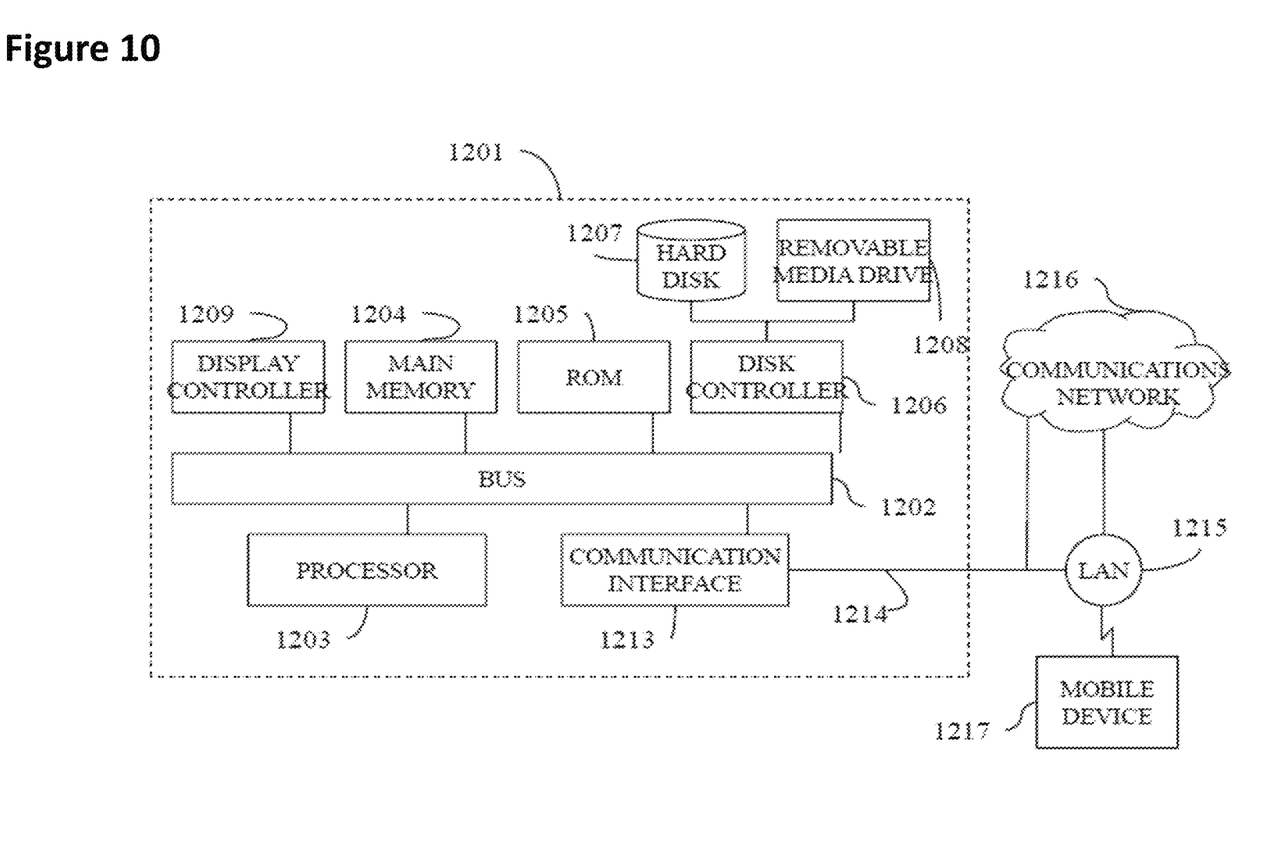
FIG. 10 is a schematic of a computer system for implementing various embodiments of the invention.

In one embodiment of the invention, there is provided a computer implemented system including a central processing unit (CPU) having a storage medium. The computer system in one embodiment monitors one of sensors 10 described above, through the control of the network analyzer 40, and the processor 50. FIG. 10 illustrates such a computer system 1201 for implementing various embodiments of the invention. The computer system 1201 may be used as the computer system to perform any or all of the functions described above, including but not limited to the steps explicitly set forth in FIG. 9. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable read only memory (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display, for displaying information to a user monitoring the status of the sensors 10. The computer system includes input devices, for interacting with a computer user and providing information to the processor 1203. The pointing device, for example, may be a mouse, a trackball, or a pointing stick for communicating direction information and command selections to the processor 1203 and for controlling cursor movement on the display.

The computer system 1201 performs a portion or all of the processing steps (or functions) of this invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

The computer code devices of the invention may be any interpretable or executable code mechanism, including but not limited to scripts, interpretable programs, dynamic link libraries (DLLs), Java classes, and complete executable programs. Moreover, parts of the processing of the invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media may also take the form of acoustic or light waves, such as those generated during radio wave and infrared data communications.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. The communication interface 1213 may exist in either or both of the network analyzer 40 and the processor 50 for establishing the above-noted two-way communication. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented between the RF network analyzer 40 and the processor 50. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave-based signals. The computer system 1201 can transmit and receive data, including program code, process data and status through the network(s) 1215 and 1216, the network link 1214, and the communication interface 1213 to other processors monitoring other corrosion sensors.

Generalized Statements of the Invention

The following is a set of generalized statements setting forth various aspects of the invention.

Statement 1. A sensor for sensing corrosion, comprising or consisting of: a substrate; an inductive element formed on the substrate and having a first inductive loop and a second inductive loop; a sensing element electrically connecting one end of the first inductive loop to an opposing end of the second inductive loop; wherein prior to dissolution of the sensing element, an inductance of the inductive element comprises a first inductance set by a total inductance of the first inductive loop and the second inductive loop having a first resonant frequency, and after dissolution of the sensing element, the inductance of the inductive element comprises a second inductance reduced from the first inductance by disconnection of the first inductive loop from the second inductive loop such that a resonance of the inductive element is changed from the first resonant frequency to a second resonant frequency. Accordingly, the sensor in one embodiment can be only these stated elements (which for example would be probed by a network analyzer), but in other embodiments could include the stated elements below or other elements discussed elsewhere in the specification.

Statement 2. The sensor of statement 1, wherein the sensing element is composed of a material which reacts to environmentally-induced changes.

Statement 3. The sensor of statement 2, wherein the environmentally-induced changes comprise one or more changes to the sensing element including one or more of temperature change, corrosion, erosion, a physical or a chemical change, cumulative damage, or degradation in electrical conductivity.

Statement 4. The sensor of any of the statements noted above, wherein the sensing element comprises a reactive metal which oxidizes upon exposure to ambient conditions in an environment of the sensor.

Statement 5. The sensor of statement 4, wherein the reactive metal comprises iron and is susceptible to corrosion.

Statement 6. The sensor of any of the statements noted above, wherein the first inductive loop and the second inductive loop comprise a non-corroding conductor.

Statement 7. The sensor of statement 6, wherein the non-corroding conductor comprises at least one of Au, Ag, Ni. or Al.

Statement 8. The sensor of any of the statements noted above, further comprising a dielectric film disposed over the sensing element to affect a rate of corrosion of the sensing element.

Statement 9. The sensor of any of the statements 1-7 noted above, further comprising a porous dielectric film over the sensing element to affect a rate of corrosion of the sensing element.

Statement 10. The sensor of any of the statements noted above, wherein the inductive element further comprises capacitive segments disposed on at least one of the first inductive loop and the second inductive loop.

Statement 11. The sensor of any of the statements noted above, further comprising a processor configured to measure a resonant frequency of the inductive element.

Statement 12. The sensor of statement 11, wherein the processor is configured to detect a change from a first resonant frequency to a second resonant frequency after the sensing element has been corroded.

Statement 13. The sensor of statement 11, wherein the processor is configured to measure an inductance of the inductive element.

Statement 14. The sensor of statement 11, wherein the processor is configured to measure a Q of the inductive element.

Statement 15. The sensor of statement 11, wherein the processor is configured to detect a shift in resonant frequency from a) a resonance of the inductive loop to b) a resonance of one of the first loop or the second loop after dissolution of the sensing element.

Statement 16. The sensor of statement 11, wherein the processor comprises a spectrum analyzer.

Statement 17. The sensor of statement 1, wherein the processor is configured for storage and communication of sensor information including one or more of: identification, date/time stamp, material description, or prior sensor measurements.

Statement 18. A system for detecting corrosion, comprising: the sensor of any of the statements 1-17 including the inductive element and the sensing element; a network analyzer coupled to the sensor; and a processor configured to a) acquire at least one of a resonant frequency and a Q of the inductive element, b) record changes over time of at least one of the resonant frequency and the Q of the inductive element as the sensing element deteriorates upon exposure of the sensing element to an ambient, and c) determine that corrosion is present based on at least one of a reduced Q and a discrete change in resonance frequency.

Statement 19. The sensor of statement 1, comprising no capacitive elements. connected to the inductive element including the first inductive loop and the second inductive loop.

Statement 20. The sensor of statement 1, comprising no additional inductive elements besides the inductive element including the first inductive loop and the second inductive loop.

Statement 21. The sensor of statement 1, comprising no resistive elements connected to the inductive element including the first inductive loop and the second inductive loop.

Statement 22. A method for detecting corrosion, comprising: acquiring at least one of a resonant frequency and a Q of a sensor (e.g., a sensor of any of the statements above) including a loop with an integrated corroding link; exposing the link of the sensor to an ambient in which the corroding link deteriorate; recording changes over time of at least one of the resonant frequency and the Q of the loop; and determining that corrosion is present based on at least one of a reduced Q and a discrete change in resonance frequency.

Statement 23. A system for detecting corrosion, comprising: an inductive element having an integrated corroding link; and a processor configured to a) acquire at least one of a resonant frequency and a Q of the inductive element, b) record changes over time of at least one of the resonant frequency and the Q of the inductive element as the corroding link deteriorates upon exposure to an ambient, and c) determine that corrosion is present based on at least one of a reduced Q and a discrete change in resonance frequency.

Numerous modifications and variations of the invention are possible in light of the above teachings. It is therefore to be understood that within the scope of the appended claims, the invention may be practiced otherwise than as specifically described herein.

The invention claimed is:

1. A sensor for sensing corrosion, comprising:
a substrate;
an inductive element formed on the substrate and having a first inductive loop and a second inductive loop, wherein the first inductive loop and the second inductive loop together form a continuous inductor coil with a first number of inductor turns;
a sensing element electrically connecting one end of the first inductive loop to an opposing end of the second inductive loop;
wherein
prior to dissolution of the sensing element, an inductance of the inductive element comprises a first inductance set by the first predetermined number of turns of the inductor coil having a first resonant frequency, and
after dissolution of the sensing element, the inductance of the inductive element comprises a second inductance reduced from the first inductance by disconnection of the first inductive loop from the second inductive loop such that a number of the inductor turns reduces from the first number of inductor turns to a second number of inductor turns for changing a resonance of the inductive element from the first resonant frequency to a second resonant frequency.

2. The sensor of claim 1, wherein the sensing element is composed of a material which reacts to environmentally-induced changes.

3. The sensor of claim 2, wherein the environmentally-induced changes comprise one or more changes to the sensing element including one or more of temperature change, corrosion, erosion, a physical or a chemical change, cumulative damage, or degradation in electrical conductivity.

4. The sensor of claim 1, wherein the sensing element comprises a reactive metal which oxidizes upon exposure to ambient conditions in an environment of the sensor.

5. The sensor of claim 4, wherein the reactive metal comprises iron and is susceptible to corrosion.

6. The sensor of claim 1, wherein the first inductive loop and the second inductive loop comprise a non-corroding conductor.

7. The sensor of claim 6, wherein the non-corroding conductor comprises at least one of Au, Ag, Ni, or Al.

8. The sensor of claim 1, further comprising a dielectric film disposed over the sensing element to affect a rate of corrosion of the sensing element.

9. The sensor of claim 1, further comprising a porous dielectric film over the sensing element to affect a rate of corrosion of the sensing element.

10. The sensor of claim 1, wherein the inductive element further comprises capacitive segments disposed on at least one of the first inductive loop and the second inductive loop.

11. The sensor of claim 1, further comprising a processor configured to measure a resonant frequency of the inductive element.

12. The sensor of claim 11, wherein the processor is configured to detect a change from a first resonant frequency to a second resonant frequency after the sensing element has been corroded.

13. The sensor of claim 11, wherein the processor is configured to measure an inductance of the inductive element.

14. The sensor of claim 11, wherein the processor is configured to measure a Q of the inductive element.

15. The sensor of claim 11, wherein the processor is configured to detect a shift in resonant frequency from a resonance of the inductive element to a resonance of one of the first loop or the second loop after dissolution of the sensing element.

16. The sensor of claim 11, wherein the processor comprises a spectrum analyzer.

17. The sensor of claim 11, wherein the processor is configured for storage and communication of sensor information including one or more of: identification, date/time stamp, material description, or prior sensor measurements.

18. A system for detecting corrosion, comprising:
a sensor comprising:
a substrate;
an inductive element formed on the substrate and having a first inductive loop and a second inductive loop, wherein the first inductive loop and the second inductive loop together form a continuous inductor coil with a first number of inductor turns;
a sensing element electrically connecting one end of the first inductive loop to an opposing end of the second inductive loop;
wherein prior to dissolution of the sensing element, an inductance of the inductive element comprises a first inductance set by the first predetermined number of turns of the inductor coil having a first resonant frequency, and after dissolution of the sensing element, the inductance of the inductive element comprises a second inductance reduced from the first inductance by disconnection of the first inductive loop from the second inductive loop such that a number of the inductor turns reduces from the first number of inductor turns to a second number of inductor turns for changing a resonance of the inductive element from the first resonant frequency to a second resonant frequency;

a network analyzer coupled to the sensor; and a processor configured to acquire at least one of a resonant frequency and a Q of the inductive element,   record changes over time of at least one of the resonant frequency and the Q of the inductive element as the sensing element deteriorates upon exposure of the sensing element to an ambient, and   determine that corrosion is present based on at least one of a reduced Q and a discrete change in resonance frequency.

19. A method for detecting corrosion, comprising:

providing a sensor comprising:

a substrate;

an inductive element formed on the substrate and having a first inductive loop and a second inductive loop, wherein the first inductive loop and the second inductive loop together form a continuous inductor coil with a first number of inductor turns;

a sensing element electrically connecting one end of the first inductive loop to an opposing end of the second inductive loop;

wherein prior to dissolution of the sensing element, an inductance of the inductive element comprises a first inductance set by the first predetermined number of turns of the inductor coil having a first resonant frequency, and   after dissolution of the sensing element, the inductance of the inductive element comprises a second inductance reduced from the first inductance by disconnection of the first inductive loop from the second inductive loop such that a number of the inductor turns reduces from the first number of inductor turns to a second number of inductor turns for changing a resonance of the inductive element from the first resonant frequency to a second resonant frequency;

acquiring at least one of a resonant frequency and a Q of a sensor including a loop with the sensor including the sensing element comprising an integrated corroding link;

exposing the link of the sensor to an ambient in which the corroding link deteriorates;

recording changes over time of at least one of the resonant frequency and the Q of the loop; and determining that corrosion is present based on at least one of a reduced Q and a discrete change in resonance frequency.

20. A system for detecting corrosion, comprising:

a sensor comprising:

a substrate;

an inductive element formed on the substrate and having a first inductive loop and a second inductive loop, wherein the first inductive loop and the second inductive loop together form a continuous inductor coil with a first number of inductor turns;

a sensing element electrically connecting one end of the first inductive loop to an opposing end of the second inductive loop;

wherein prior to dissolution of the sensing element, an inductance of the inductive element comprises a first inductance set by the first predetermined number of turns of the inductor coil having a first resonant frequency, and   after dissolution of the sensing element, the inductance of the inductive element comprises a second inductance reduced from the first inductance by disconnection of the first inductive loop from the second inductive loop such that a number of the inductor turns reduces from the first number of inductor turns to a second number of inductor turns for changing a resonance of the inductive element from the first resonant frequency to a second resonant frequency;

the inductive element of the sensor including the sensing element comprising an integrated corroding link; and a processor configured to   acquire at least one of a resonant frequency and a Q of the inductive element,   record changes over time of at least one of the resonant frequency and the Q of the inductive element as the corroding link deteriorates upon exposure to an ambient, and   determine that corrosion is present based on at least one of a reduced Q and a discrete change in resonance frequency.

\* \* \* \* \*

UNITED STATES PATENT AND TRADEMARK OFFICE
CERTIFICATE OF CORRECTION

| | |
|---|---|
| PATENT NO. | : 11,300,498 B2 |
| APPLICATION NO. | : 16/453117 |
| DATED | : April 12, 2022 |
| INVENTOR(S) | : Scott Goodwin |

It is certified that error appears in the above-identified patent and that said Letters Patent is hereby corrected as shown below:

In the Specification

Insert Column 1:
-- STATEMENT REGARDING FEDERALLY SPONSORED RESEARCH OR DEVELOPMENT
This invention was made with government support under DE-FE0029062 awarded by the U.S. Department of Energy. The government has certain rights in the invention. --

Signed and Sealed this
Twenty-second Day of August, 2023

Katherine Kelly Vidal
*Director of the United States Patent and Trademark Office*